US012779983B2

(12) United States Patent
Hung et al.

(10) Patent No.: US 12,779,983 B2
(45) Date of Patent: Nov. 3, 2026

(54) AIR INTAKE SHUTTER SYSTEM

(71) Applicant: VENTRA GROUP, CO., Halifax (CA)

(72) Inventors: Joaquin Hung, Markham (CA); Michael Engle, Grosse Pointe Woods, MI (US); Zachary Bucki, South Rockwood, MI (US)

(73) Assignee: VENTRA GROUP CO., Halifax (CA)

( * ) Notice: Subject to any disclaimer, the term of this patent is extended or adjusted under 35 U.S.C. 154(b) by 218 days.

(21) Appl. No.: 18/888,966

(22) Filed: Sep. 18, 2024

(65) Prior Publication Data

US 2025/0121677 A1 Apr. 17, 2025

Related U.S. Application Data

(60) Provisional application No. 63/589,868, filed on Oct. 12, 2023.

(51) Int. Cl.
*B60K 11/08* (2006.01)

(52) U.S. Cl.
CPC .................................. *B60K 11/085* (2013.01)

(58) Field of Classification Search
CPC ........................ B60K 11/085; B60Y 2400/411
See application file for complete search history.

(56) References Cited

U.S. PATENT DOCUMENTS 8,708,078 B2 * 4/2014 Charnesky ........... B60K 11/085 49/77.1
8,807,629 B2 8/2014 Benvenuto et al.
9,039,068 B2 5/2015 Niemi et al.
9,764,706 B2 9/2017 Benvenuto et al.
10,017,048 B2 7/2018 Manhire
(Continued)

FOREIGN PATENT DOCUMENTS

DE 102009052372 A1 5/2011
DE 102018004361 A1 * 12/2019 ............. B60K 11/06
(Continued)

OTHER PUBLICATIONS

Extended European Search Report dated Mar. 27, 2025, issued in corresponding European Patent Application No. 24205255.3 (8 pgs.).

*Primary Examiner* — Edwin A Young
(74) *Attorney, Agent, or Firm* — CUSHMAN PARTNERS, LLC

(57) ABSTRACT

An active vehicle air intake shutter system has an intake shutter assembly that is pivotable about a shutter axis. The intake shutter assembly includes an input connector offset radially to the shutter axis. An actuator has an output shaft rotatable about an actuator axis. The output shaft has an output connector offset radially to the actuator axis. An intermediate linkage has a shutter connector and an actuator connector. The actuator connector and the output connector provide an output multi-axial joint offset radially from the actuator axis. The shutter connector and the input connector provide an input multi-axial joint offset radially from the shutter axis. The input and output multi-axial joints each provide for multi-axial rotation of the input and output ends of the intermediate linkage, respectively, to accommodate installation of the shutter system with the actuator and shutter axes oriented in a non-parallel or skewed manner.

34 Claims, 10 Drawing Sheets

(56) References Cited

U.S. PATENT DOCUMENTS

| | | | | |
|---|---|---|---|---|
| 10,093,173 | B1 * | 10/2018 | Frayer .................. | B60K 11/085 |
| 10,384,730 | B2 | 8/2019 | Klop et al. | |
| 10,730,384 | B1 * | 8/2020 | Klop .................... | B60K 11/085 |
| 10,787,141 | B2 | 9/2020 | Vacca et al. | |
| 10,900,409 | B2 | 1/2021 | Clapie et al. | |
| 11,072,378 | B2 | 7/2021 | Klob et al. | |
| 2013/0223980 | A1 | 8/2013 | Pastrick et al. | |
| 2021/0061373 | A1 | 3/2021 | Guyon | |
| 2023/0174171 | A1 | 6/2023 | Hung et al. | |
| 2024/0351429 | A1 | 10/2024 | Hung et al. | |

FOREIGN PATENT DOCUMENTS

| | | | |
|---|---|---|---|
| DE | 102020108797 | A1 | 10/2020 |
| EP | 102009052372 | A1 | 5/2011 |
| EP | 3638531 | B1 | 8/2021 |

* cited by examiner

AIR INTAKE SHUTTER SYSTEM

CROSS-REFERENCE TO RELATED APPLICATIONS

This application claims priority to U.S. Provisional Application No. 63/589,868, filed Oct. 12, 2023, the subject matter of which is incorporated herein by reference in its entirety.

BACKGROUND

Field

The present application relates to an active vehicle air intake shutter system for installation at an air intake opening on a front end of a motor vehicle.

Background

Shutter systems are known for installation in air intake openings located at the front end of the vehicle. Examples include U.S. Pat. Nos. 10,017,048, 10,900,409, and 10,787,141 and U.S. Patent Pub. 2013/0223980, the entirety of each of which is incorporated herein by reference. Typical shutter systems, also called AGS systems (active grill shutter systems), are not well-designed for vehicles with front ends aerodynamically curved in the lateral direction, particularly where the air intakes are angled relative to one another and the centerline of the vehicle.

As vehicles are being aerodynamically contoured more aggressively to improve energy efficiency (e.g., fuel efficiency in a gasoline engine vehicle, or battery energy efficiency in an electric vehicle—or both in in a hybrid vehicle), this issue becomes more challenging. The angling makes driven connection of multiple systems for synchronous operation challenging and more expensive. Moreover, packaging space at the front end of a vehicle is also becoming more constrained in the industry because of the inclusion of other features, such as sensors, cameras, and the like, at the front end of the vehicle.

One option is to use a conventional grill shutter assembly for each air intake and provide each shutter assembly with its own actuator coaxial with the grill shutter assembly's axis. That may not be an option in a space that will not accommodate the actuator next to the grill shutter. That is particularly the case where the actuator uses a gear box to increase its torque output. Higher torque output is typically needed because, in addition to the mass of the shutter panel itself, most grill shutter systems are controlled to close when the vehicle exceeds a certain speed for improving front-end aerodynamics. Thus, additional torque is needed to counteract any air flow force pushing against the shutter panel as it closes. Drive cables are another option to enable the actuator to be located separately from the shutter assembly. However, while drive cables can be routed quite easily, their very small cross-section relative to their length make them generally unsuitable for providing suitable torsional rigidity. Moreover, torsional deflection occurring in the cable can introduce lag in the opening or closing action, as some of the pivoting motion results in cable twisting (torsional deflection) prior to positive opening/closing action of the shutter panel. In addition, cables tend to be expensive in comparison to a shaft or other rigid structures.

SUMMARY

One aspect of the present application provides an active vehicle air intake shutter system for installation at an air intake opening on a front end of a motor vehicle. The opening extends at least in a lateral direction of the vehicle. The shutter system comprises an intake shutter assembly for mounting at the air intake opening. The intake shutter assembly comprises a shutter panel. The intake shutter assembly is pivotable about a shutter axis between a closed position positioning the shutter panel to block airflow through the air intake opening and an open position positioning the shutter panel to permit airflow through the air intake opening. The intake shutter assembly includes an input connector offset radially with respect to the shutter axis.

The system also comprises an actuator having an output shaft rotatable about an actuator axis. The output shaft has an output connector offset radially with respect to the actuator axis. An intermediate linkage has a shutter connector for coupling to the input connector and an actuator connector for coupling to the output connector to enable rotation of the output shaft in a first direction to pivot the shutter assembly in an opening direction and a second direction to pivot the shutter assembly in a closing direction. The actuator connector and the output connector are configured to provide an output multi-axial joint offset radially from the actuator axis. Also, the shutter connector and the input connector are configured to provide an input multi-axial joint offset radially from the shutter axis. The input and output multi-axial joints each provide for multi-axial rotation of the input and output ends of the intermediate linkage, respectively, to accommodate installation of the shutter system with the actuator axis and the shutter axis oriented in a non-parallel or skewed manner.

In one embodiment, the output multi-axial joint may be an output ball joint and the input multi-axial joint may be an input ball joint.

Another aspect of the present application provides a motor vehicle comprising the active vehicle air intake shutter system discussed above (or any embodiment thereof) installed on the front end of the vehicle.

Other objects, aspects, and advantages of the present application will become apparent from the following detailed description, the accompanying drawings, and the appended claims.

DETAILED DESCRIPTION OF THE DRAWINGS

Figure 1:
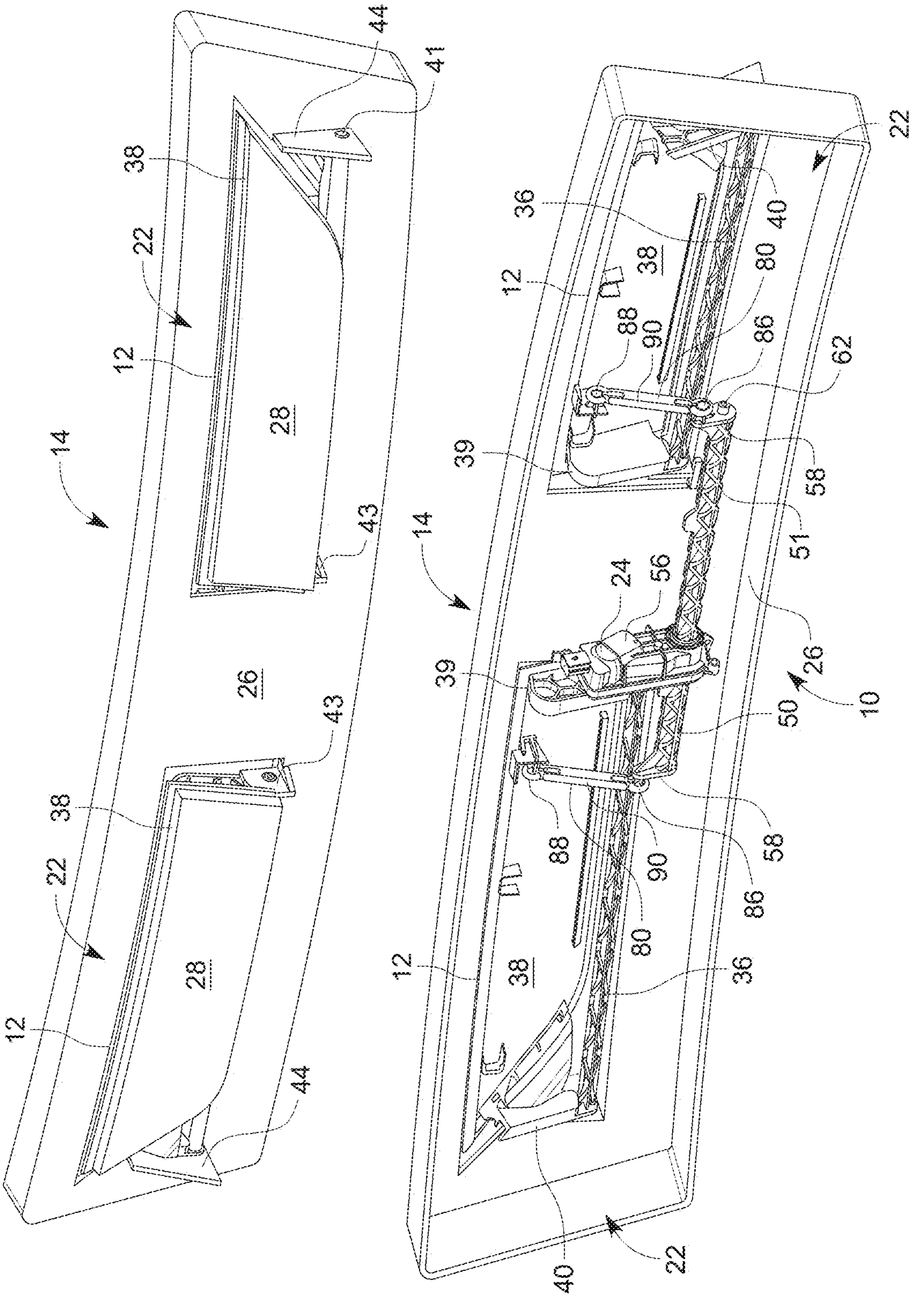
FIG. 1 is perspective views from the front and rear of a vehicle body panel including an active grill shutter system of the present application, with the shutter assemblies in the closed position.

An active vehicle air intake shutter system 10 is provided for installation at an air intake opening 12 on a front end 14 of a motor vehicle. The motor vehicle may be of any type, such as a passenger vehicle, pick-up truck, over the road tractor, etc. Any vehicle that has an engine, electric motor, radiator, heat exchange system, electronics, or other internal components that may benefit from air intake for cooling or provision of air for certain functions may use the air intake shutter system 10 and the type of vehicle is not intended to be limiting.

The non-limiting embodiment illustrated includes multiple shutter assemblies 22 (discussed in more detail below) each for an associated air intake opening 12 on the vehicle front end 14. The shutter assemblies share a common actuator 24, such as being connected by a shaft or shafts so that one actuator 24 can open/close multiple shutter assemblies 22. Commonly-owned application, U.S. Provisional Application Ser. No. 63/497,655, and its related U.S. Utility application Ser. No. 18/642,166, is directed to a shutter system with angled joints and discloses vehicle front end configurations with multiple air intake openings and the use of a common shaft to connect one actuator to multiple shutter assemblies. That application is incorporated herein in its entirety for all details, including for vehicle front end configurations, the mounting of basic components, and use of a common actuator to drive multiple shutter assemblies.

In other embodiments, the shutter system 10 may have one shutter assembly 22 used on one intake opening with its own actuator. Thus, a vehicle front end with multiple air intake openings may have a separate system for each air intake opening. The principles of the present application are described with respect to the illustrated embodiment with multiple shutter assemblies with a common actuator, but can be applied to systems having a shutter assembly with its own actuator or any other design.

The vehicle front end 14 may be of any construction or configuration. It may have a single or multiple air intake openings 12. The illustrated embodiment depicts air intake openings 12 on the driver and passenger sides of the vehicle in symmetrical fashion with respect to the fore-aft direction of the vehicle. Thus, there is collectively one system 10 with a shutter assembly 22 for each of the symmetrically arranged openings 12. The air intake openings 12 may be provided in any part of the front end 16 that faces generally forwardly such that air is taken into the openings 12 as the vehicle is driven forwardly. Of course, air may flow into the openings 12 while the vehicle is stationary, but substantially more air is typically forced into the openings during forward travel of the vehicle. For example, the openings 12 may be formed in the main body structure of the vehicle front end 14, or the bumper attached to the main body structure may have the openings 12. In the illustrated embodiment, the openings 12 are formed in a panel 26 mounted beneath a bumper on the main front end fascia structure. The panel 26 may be a grill, and may also include other functional components, such sensors, cameras, lighting elements, etc. The specific structure of the vehicle front end 14 where the air intake openings 12 are located is not intended to be limiting and any location may be used.

The panel 26 may be the front panel of a module that mounts to the vehicle front end, such that multiple components, including the shutter system 10 and possibly other functional components, can be pre-assembled into one subassembly for installation into the vehicle front end. A rear panel may also mount to the rear side of the panel 26 to cover the components, including the shutter system 10, for protection, such as from road debris. The panel 26 may also be an internal panel or support, with another panel that goes over the front surface of it to be visible from the front of the vehicle. The particular panel or other mounting structure is not limiting, and the freedom provided by the system 10 enables mounting in a variety of different installation configurations.

As energy efficiency becomes more of a concern in the industry, more aggressive front end curvatures have become more common. Where multiple air intake openings 12 are used, particularly in one or more symmetrical pairs, they are typically angled relative to one another to extend in both the rearward and lateral directions of the vehicle. The lateral direction of the vehicle is also often referred to as the cross-body or cross-vehicle direction, and is perpendicular to the fore-aft direction of the vehicle 18, which is also often referred to as the front-to-rear, longitudinal, front-to-back or front-to-rear direction or axis. The openings 12 are angled relative to one another due to the shape of the vehicle front end 14. Specifically, a vehicle front end 14 may be rounded/bowed or angled so as to curve or angle laterally and rearwardly, typically to make the vehicle front end 14 more aerodynamic (as opposed to having a straighter or more flattened shape in the direction of vehicle travel). The panel 26 is shown as having such a bowed configuration. The shape of the front end 14 or panel 26 thereof is not intended to be limiting, and may have any configuration where an angle between air intake openings 12 and the vehicle fore-aft axis is created. The openings 12 themselves also may have curvature in the lateral direction following a curvature of the part on the vehicle front end 14 on which they are located. The openings 12 likewise may be straight or linear with no curvature, meaning they are angled but the lengthwise direction of the openings 12 are straight. The height or vertical direction of the openings 12 may also be straight/linear or curved. Thus, the particular shape of the openings 12 is not intended to be limiting.

With respect to the non-limiting shutter assembly illustrated as an example, the system 10 comprises the intake shutter assemblies 22 for mounting at the air intake opening 12. The shutter assemblies 22 are essentially the same, except they are designed as mirror images for being on the driver and passenger sides of the vehicle. Thus, common reference numbers will be used for the same or corresponding components. The actuator shafts 50, 51 may have different lengths to allow the actuator 24 to be mounted adjacent on assembly 22 with the shorter one 50 connected to the adjacent assembly 22 and the longer one 51 connected to the distal assembly 22 (the one further away). Each intake shutter assembly 22 is movable between a closed position blocking airflow through the air intake opening 12 and an open position permitting airflow through the air intake opening 12. Specifically, each shutter assembly 22 comprises a shutter panel 28, and the intake shutter assembly 22 is pivotable about a shutter axis 30 between a closed position positioning the shutter panel 28 to block airflow through the air intake opening 12 and an open position positioning the shutter panel 28 to permit airflow through the air intake opening 12. When the panel 28 is moved to block the opening 12, it is closed, and when it is pivoted away from the opening 12 to allow air flow therethough it is open. However, when a shutter assembly 22 is in a closed position blocking airflow into the air intake 12, a perfect seal is not required, and being closed to block airflow means that a sufficient portion of the airflow is blocked from flowing into the vehicle front end 14. Likewise, when a shutter assembly 22 is in an open position permitting airflow into the air intake, a completely unobstructed airflow is not required and being open to permit airflow means the air intake 12 is opened to permit a sufficiently high amount of airflow into the vehicle front end 14. A person of ordinary skill in the art would readily understand what open and closed means, and understands that neither perfect sealing nor perfect lack of obstruction is needed to be considered closed or open, respectively.

Although these systems are often referred to in the art as AGS systems (active grill shutter systems), the presence of a grill is not technically required despite the general term used, and a design where no grillwork is present may still be considered in the AGS category. In some embodiments, the shutter panel 28 can be positioned to be flush or continuous with the exterior surface of the vehicle front end 14 in the closed position, and thus may be a continuous part of the vehicle exterior surface. In other embodiments, the panel 28 can be located recessed inwardly from the exterior surface. Moreover, the particular structure of the shutter assembly or assemblies 22 in general is an example and not limiting in any aspect.

For example, in other embodiments, a shutter assembly 22 could have multiple, smaller shutter panels that are joined to move together (also referred to as louvers), such as is shown in references cited in the Background Section. Using the joints of the present application as discussed below, such an intake shutter assembly 22 can be oriented at a lateral and rearward angle with the actuator shaft 50, 51 on an actuator axis 52 in the (lateral) cross-car direction (or in another non-parallel or skewed manner, as discussed below) and all the shutters of an assembly can be linked together to a common input structure so they open/close together. Thus, the present application is not limited to embodiments where the intake shutter assembly has a single shutter panel.

Each illustrated intake shutter assembly 22 includes an input connector 32 offset radially with respect to the shutter axis 30. Thus, the input connector 32 travels circumferentially about the shutter axis 30. As will be discussed, the input connector 32 is in the form of a ball 34. The input connector 32 is offset radially such that force applied to it moves the shutter assembly 22, and specifically the panel 28, about the shutter axis 30 between the open and closed positions.

In the illustrated embodiment, the shutter assembly 22 includes a shutter shaft 36 mounted on the shutter axis 30. The assembly 22 also includes a bracket 38 to which the shutter panel 28 is mounted on a forward surface thereof. The bracket 38 is an option, but is advantageous for enabling the same bracket 38 to be used with shutter panels of different exterior finish for matching different vehicles, different paint, different materials, etc. The structures herein for mounting the bracket 38 could be connected directly to the panel 28, but the bracket 38 allows the same structure to be used for different panels, and the bracket 38 can also be made of a more rigid material than the shutter panel 28 for structural support.

The illustrated, non-limiting intake shutter assembly 22 also comprises an inboard arm 39 extending radially with respect to the shutter axis 30. A second, outboard arm 40 is optionally spaced from the arm 39 for additional structural support and transmission of rotational force. The input and second arms 39, 40 fixedly connect the shutter panel 28 to the shutter shaft 36 for supporting the shutter panel 28 on the shutter shaft 36 to pivot between the open and closed positions thereof. Specifically, in the illustrated embodiment the input and second arms 39, 40 are connected to the bracket 38 to support the bracket 38 on the shutter shaft 36, and hence the shutter panel 28 mounted to the bracket 38 is likewise supported on the shutter shaft 36. As mentioned, if the bracket 38 is omitted, direct connection to the panel 28 may be used.

Each input connector 32, and specifically the input connector ball 34, is fixedly mounted to a bracket or other structure located along an upper edge of the bracket 38 between the two arms 39, 40. In some embodiments, the input connector 32 may be mounted to an arm, such as on the inboard arm 39.

Each shutter shaft 36 has a pair of mounting pins 41 on the axial ends thereof that are rotatably mounted to shutter supports 43, 44 on the panel 26. This mounts the shutter assembly 22 for pivotal movement of the panel 28 between the open and closed positions. Any suitable mounting for the shutter assembly 22 may be used that enables the movement between the open and closed positions, and the illustrated design is not limiting. The pins 41 need not be directly part of the shaft 36, for example, and could be parts attached to the arms 39, 40 in co-axial relation with the shaft 36. Likewise, the parts could be reversed such that the shutter assembly 22 includes openings at the axial ends that receive pins, fasteners, or other rotatable supports inserted therein for connection. As another example, the two arms 39, 40 could be pivotally connected to a fixed shutter shaft (rather than being fixed to a pivoting shaft) and pivot together about the shaft with the arms 39, 40 passively following the bracket 38/panel 28 due to its connection to the input connector 32. Likewise, each arm 39, 40 could be connected individually by its own pivotal connection, such as its own shaft, a nut/bolt connection, etc., without using any shaft extending between the two arms 39, 40.

As mentioned, the actuator 24 has an output shaft 50, 51 for each shutter assembly 22, and each is rotatable about an actuator axis 52. The actuator 24 in the illustrated embodiment may be an electromechanical actuator, such as an electric motor, solenoid, or any other device that pivots its output which in turn causes the pivoted/opening closing action of the shutter assembly 22. The actuator 24 in other embodiments may also be hydraulically or pneumatically operated.

Generally, in most active intake shutter systems, the shutter assemblies 22 are closed when the vehicle exceeds a certain speed, which helps improve the front-end aerodynamics. The shutter assemblies 22 may also be kept closed for a certain period after vehicle start-up, even at low speeds, to avoid intaking air to facilitate the engine or other components warming up faster (also referred to as cold-start situations). The decision to open/close the shutter assemblies may also be dependent on ambient temperature, engine temperature, or the temperature of some other component of interest, like a battery for an electric vehicle or a radiator to increase heat exchange for cooling. The decision on when the open/close the shutter assemblies 22 is typically made in an electric module in the vehicle, such as the vehicle's ECU (engine control unit, or a corresponding control unit for an electric or hybrid vehicle) or BCU (body control unit-if the hardware governing body systems is separate from the ECU), and is sent by an electric control signal to the actuator 24. The logic for determining when to open/close the shutter assemblies 22 is not intended to be limiting, and these examples are provided for context only.

The output shafts 50, 51 may be of any length and each has an output connector 54 offset radially with respect to the actuator axis 52. In the illustrated embodiments, the actuator 24 includes an electric motor for rotating the output shafts 50, 51. The motor is in a housing 56, and a gear train comprising one or more gears for speed reduction/increased torque may be included in the housing 56. Specifically, the gear train is coupled between the motor and the output shaft 50 to increase the torque applied from the motor to the shafts 50, 51. The gear train is optional, but is preferred as it allows a less expensive, less power consuming, and/or smaller motor to be used. The design may also use a single output shaft that is connected within the actuator 24 and extends from one shutter assembly 22 to the other, as opposed to two separate shafts 50, 51. Also, the ouput shafts 50, 51 are shown as having a common actuator axis 52 in the cross-vehicle direction, but in some embodiments they can be angled to have two angled axes 52.

In the illustrated non-limiting embodiment, the actuator 24 comprises an output arm 58 extending radially from each output shaft 50, 51 and having the output connector 54. The output connector 54 is discussed further below, and in the illustrated embodiment is a connector ball 60. The arm 58 may extend perpendicularly to the shaft 50 and axis 52 as illustrated, or be at an angle that has a substantial radial component. The arm 58 also may have an elongated configuration as illustrated, but need not be elongated. The term arm is a general term to describe a structure that extends from the shaft 50 for offsetting the output connector 54 from the actuator axis 52 so it can travel circumferentially about the axis 52. An advantage of the having the connector 54 offset radially from the actuator axis 52 is that it increases the mechanical leverage, providing more force per unit torque for transfer to the shutter assembly 22 (through the linkage 80) discussed below.

The motor of the actuator 24 may be mounted in any manner, such as a fasteners, adhesives, plastic staking, etc., and it may be secured to the panel 26, another opposing panel, or some other structure in the vehicle front end. Likewise, the shafts 50, 51 of the actuator 24 may have the free ends thereof rotatably supported to enable the shafts 50, 51 to pivot in a supported manner. Pins 61, 62 are shown on the shaft free ends, which may be engaged with brackets or another type of suitable support. Any suitable attachment for the shaft ends may be used, such as fasteners or pins inserted into openings on the shaft ends, journals, bearings, etc. The supports for the actuator and shaft ends are omitted for clarity (i.e., to avoid obscuring other parts), and are readily known in the art.

The system 10 also comprises an intermediate linkage 80 for each shutter assembly 22. Each linkage 80 has a shutter connector 82 for coupling to the input connector 32 and an actuator connector 84 for coupling to the output connector 54. As discussed below, these connections enable rotation of the output shaft 50, 51 in a first direction to pivot the shutter assembly 22 in an opening direction and a second direction to pivot the shutter assembly 22 in a closing direction. Specifically, in the illustrated embodiment each intermediate linkage 80 extends between the connectors 32, 54 so that rotation of the shaft 50, 51 causes the connector 54 to travel circumferentially about the actuator axis 52, which in turn moves the linkages 80 to cause each connector 32 to travel circumferentially about the shutter axis 30. This transfers force from the actuator 24 to the shutter assembly 22 for opening/closing thereof.

Figure 5:
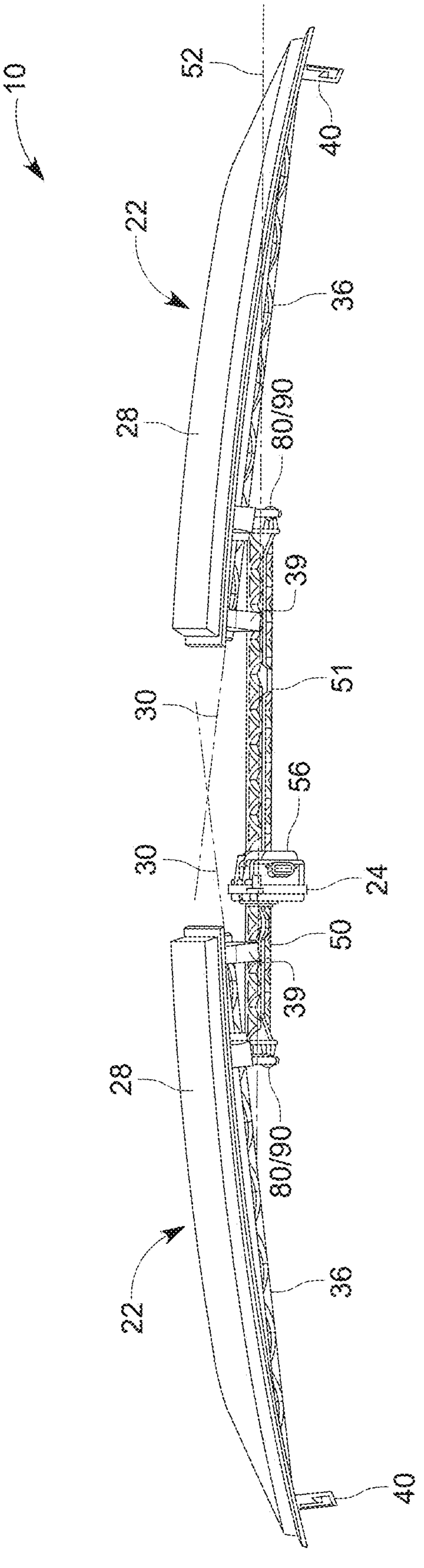
FIG. 5 is a top view of the system of FIG. 1.

As can be seen from the Figures, and particularly FIG. 5, the shutter and actuator axes 30, 52 are non-collinear, and specifically are oriented in a non-parallel or skewed manner. As used herein in the terms non-parallel and skewed are used in the geometrical sense. That is, the term non-parallel refers to two axes that are co-planar but not parallel (and conversely two parallel lines are likewise co-planar). The term skewed refers to two axes that are not co-planar (which also means they cannot be parallel, because parallel lines by definition must be in the same plane). Thus, reference to the shutter and actuator axes 30, 52 as being non-parallel or skewed manner includes both an arrangement where such axes may be co-planar, but not parallel, or an arrangement where they are not co-planar at all and hence skewed.

The choice of the relative orientation between the axes 30, 52 may be dictated by the vehicle front end design, and specifically packaging constraints for the mounting of the shutter assembly 22 and the actuator 24. As an example, in the illustrated embodiment each shutter assembly 22 is mounted at an intake opening 12 on the vehicle front end 14 that extends laterally and rearwardly, so each shutter axis 30 is likewise oriented laterally and rearwardly. As mentioned, the vehicle front end may have such a shape sweeping laterally and rearwardly towards the vehicle lateral side for improved aerodynamics. By mounting the actuator 24 spaced from the shutter assembly 22 and enabling the actuator axis 52 to be skewed or non-parallel relative to the shutter axes 30 (or axis in a single shutter assembly system), the system 10 has more freedom for different installation arrangements.

For example, in the illustrated design each shutter assembly 22 is mounted in the space beneath a bumper a sweeping shape so its panel 28 in the closed position is flush with the vehicle exterior, and thus each shutter axis 30 is oriented in both the lateral and rearward directions of the vehicle 12. The inventors have recognized it can be difficult to package the actuator 24 so that its axis 52 is collinear or parallel to a shutter axis 30. For example, an aggressive curvature of the vehicle front end 14 may preclude placement of the actuator 24 with its axis collinear or parallel to the shutter axes 30. Likewise, narrow spacing, such as a vertically narrow space (either below or inside a bumper), may limit component size. Also, the presence of other components on the vehicle front end 14 in the area for installation, such as sensors, cameras, etc. may limit the space available.

In the illustrated embodiment, the actuator 24 is mounted with its axis 52 oriented in the cross-vehicle/lateral direction only, and that axis 52 is located rearwardly and vertically below the shutter axes 30. Because each shutter axis 30 extends laterally and rearwardly, and is not coplanar with the actuator axis 52, each axis 30 and the axis 52 are oriented in a skewed manner. This is a non-limiting example, and illustrates how the actuator 24 can be mounted in spaced apart relation from the shutter assembly 22, such as with the motor housing 56 spaced further rearwardly, to accommodate aggressive front-end curvature or the presence of some other component like a sensor, camera, etc. The installation freedom may also enable the actuator 24 and its shaft 50 or shafts 50, 51 be mounted separately from the shutter assembly 22 to a more structurally rigid part of the vehicle, such as a frame component, which may lessen the weight and/or forces borne by a fascia component like a body panel, body support or bumper.

As mentioned above, in the illustrated embodiment the system 10 may have multiple shutter assemblies 22, such as a pair with one on the driver's side and one on the passenger's side, that are driven by a common actuator 24. In such an embodiment, the actuator 24 has a common output shaft or two output shafts 50, 51 extending in the cross-car/lateral direction and coupled to the intermediate linkage 80 for each shutter assembly 22, while those shutter assemblies 22 each have its shutter axis 30 extending in a lateral and rearward direction of the vehicle 10 (and the axes 30 are diverging, as they extend laterally in opposite directions from the vehicle centerline). Thus, the ability to have the shutter and actuator axes 30, 52 oriented in a skewed or non-parallel manner has advantages for enabling a system with multiple shutter assemblies 22 and a single actuator to be implemented.

In the non-limiting illustrated embodiment, on each side of the system 10 illustrated, the actuator connector 84 and the output connector 54 are configured to provide an output ball joint 86 offset radially from the actuator axis 52. The shutter connector 82 and the input connector 32 are also configured to provide an input ball joint 88 offset radially from the shutter axis 30. The input and output ball joints 86, 88 each provide for multi-axial rotation of the input and output ends of the intermediate linkage 80, respectively. The multi-axial rotation at the opposing linkage ends accommodates installation of the shutter system 10 with the actuator axis 52 and the shutter axis 30 oriented in a non-parallel or skewed manner, as discussed above.

The intermediate linkage 80 comprises at least one link arm, and may have any construction or configuration. In the non-limiting illustrated embodiment, the system 10 has a single link arm 90 providing the input and output ends of the intermediate linkage 80. The link arm 90 illustrated is elongated and straight, but may have any construction or configuration suitable to connector the connectors 32, 54.

The output ball joint 86 may include the actuator connector ball 60 as the output connector 54 and a socket opening 92 as the actuator connector 84 for receiving the ball 60. Also, the input ball joint 88 may include the shutter connector ball 34 as the input connector 32 and a socket opening 94 as the shutter connector 82 for receiving the ball 34. Thus, use of the ball joints 86, 88 created by the ball/socket connections provides for the multi-axial rotation of the linkage input and output ends.

Specifically, in the illustrated embodiment the actuator axis 52 may be considered the X-axis as a point of reference chosen for convenience of explanation. The Y-axis would extend perpendicularly vertically to the X-axis and the Z-axis would extend perpendicularly horizontally to the X-axis. Using rotation of the illustrated shaft 51 as an example shown in FIGS. 8 and 9, as the output shaft 51 is rotated about the X-axis, the output connector 54 (ball 60) travels circumferentially about the X-axis parallel to the Y-Z plane. As the input connector 32 (ball 34) is moved by the link 90 to move the shutter assembly 22 between the open/closed positions, the input connector 32 (ball 34) travels circumferentially about the shutter axis 30. However, because the shutter axis 30 is skewed relative to the actuator axis 52, the input connector's 32 path of travel is complex within the X-Y-Z system (i.e., defined using the actuator axis 52 as the convenient point of reference), meaning the input connector's 32 movement has components in all three X, Y and Z directions. This can be appreciated from the movement as the shutter assembly 22 is opened, where the input connector 32 (ball 34) travels on a path in which it moves downwardly (in the Y direction, the vertical direction of the page) and rearwardly (in the Z direction, rearward being out of the page), while also moving in the X-direction towards the output shaft 50. As can be appreciated from comparing the open and closed positions, the positional attitude of the linkage 80, in the form of link arm 90, changes between the open and closed positions.

The ball joints 86, 88 permit multi-axial rotation of the linkage ends about the ball joints to accommodate the difference in travel paths. Specifically, the output ball joint 86 allows the socket 92 and the associated linkage end to pivot on the ball 60 about an axis parallel to the actuator axis 52 (the X-axis) as the ball 60 travels about the actuator axis 52 parallel to the Y-Z plane. The ball joint 60 also allows the socket 92 and its linkage end to pivot on the ball 60 about an axis in the Z-direction, and also possibly about an axis in the Y-direction, to accommodate the linkage's 84 change in attitude between the open and closed positions. (These axes are referred to as being in the Y and Z directions because the ball 60 is offset from the actuator/X axis 52, and thus such axes for movement about the ball 60 are parallel to axes of the XYZ system defined above with respect to the actuator axis 52). As can be seen by comparing the Figures showing the open and closed positions, the link arm 90 in the open position has changed its angle about the axis in the Z-direction during the opening movement in which the ball 60 travels circumferentially about the X-axis/actuator axis 52. During the closing to opening movement linkage 80 may also pivot about the axis in the Y-direction as well so it can follow the travel path of the input connector ball 34 while connected thereto.

Figure 8:
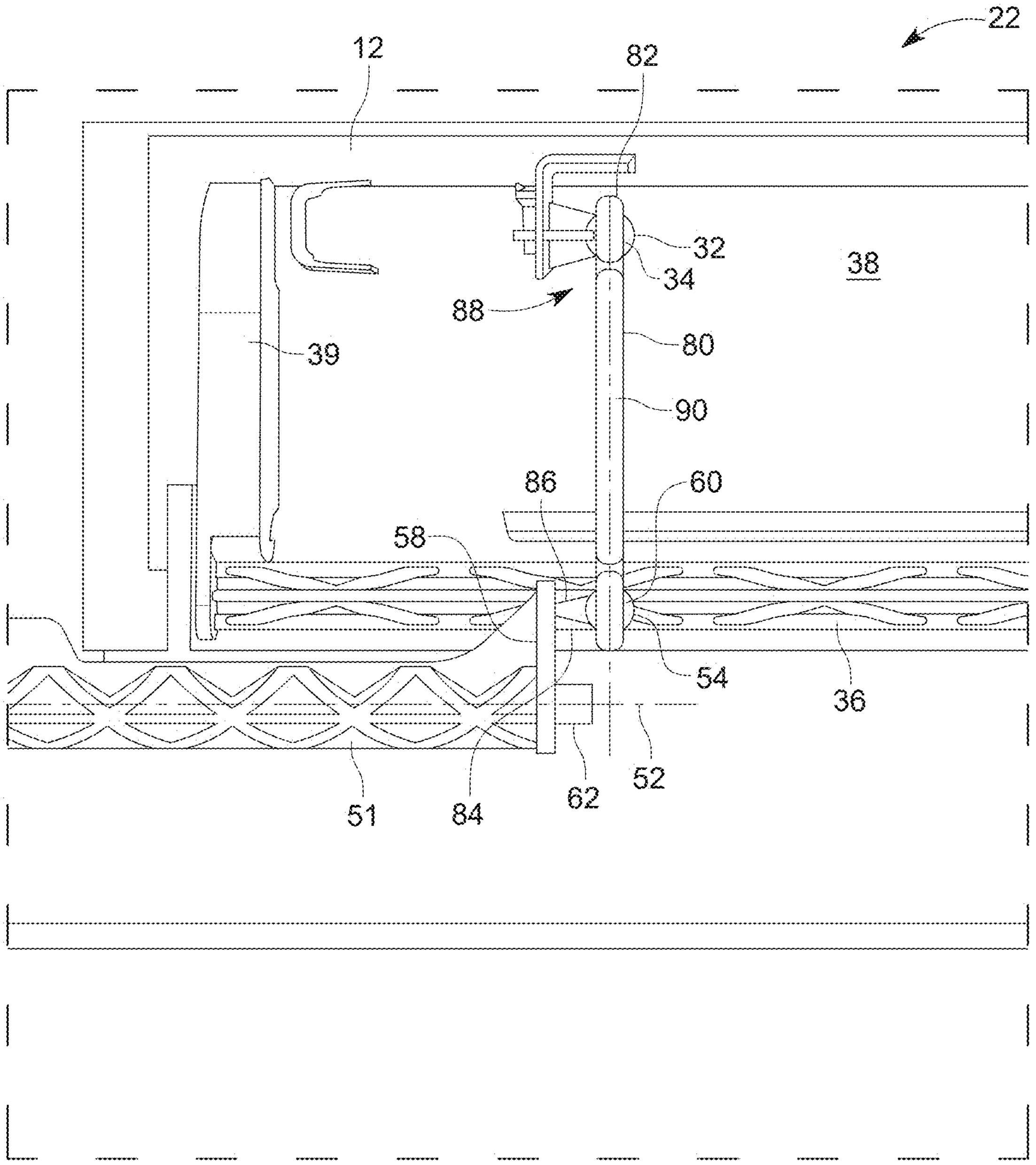
FIG. 8 is a close-up rear view showing a linkage and connections thereof used in the system, with the shutter assembly in the closed position.
Figure 9:
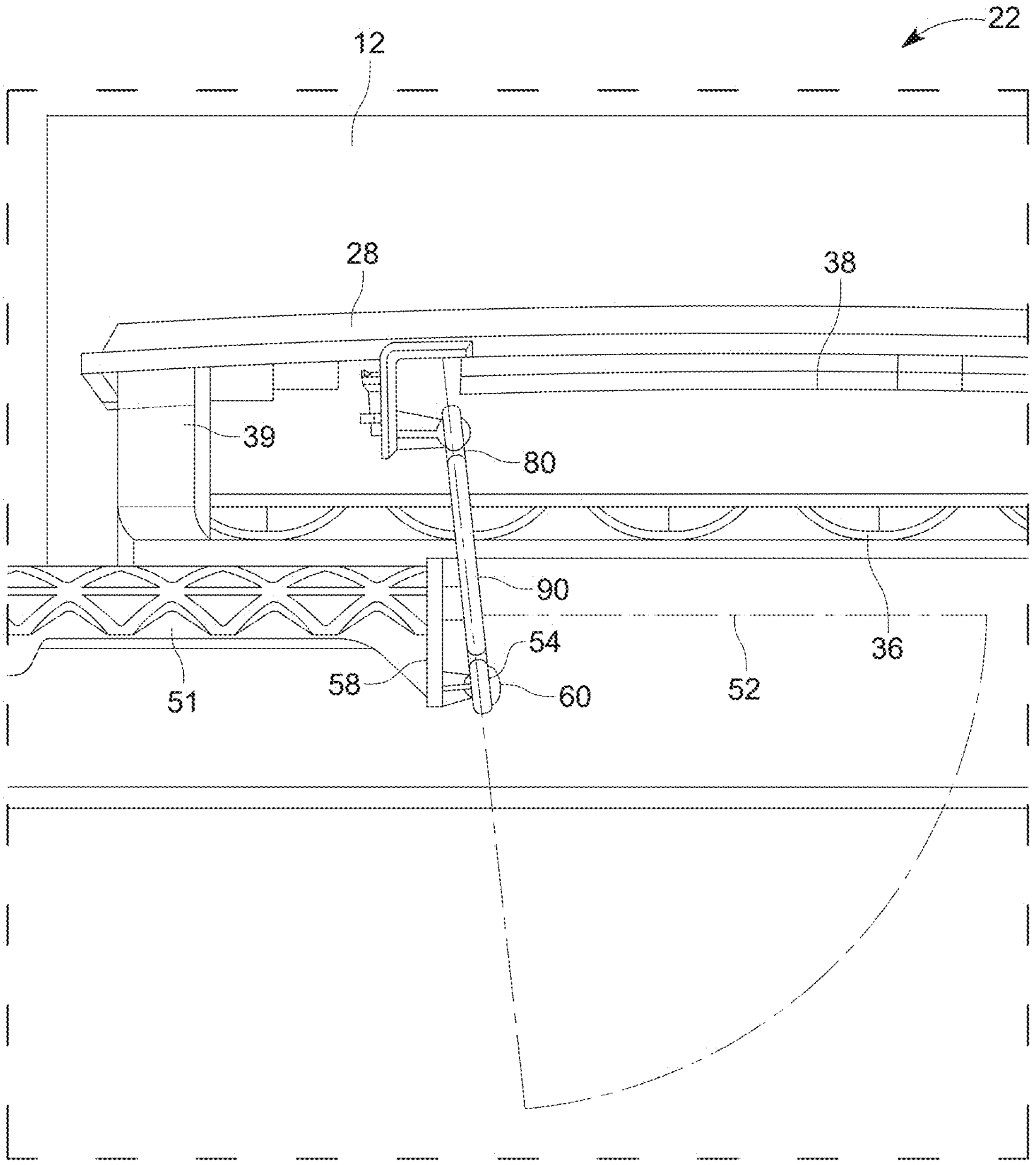
FIG. 9 is a view similar to FIG. 8, with the shutter assembly in the open position.

The input ball joint 88 functions in the same manner. Specifically, the input ball joint 88 allows the socket 94 and the associated linkage end to pivot on the ball 34 about an axis parallel to the shutter axis 30 as the ball 34 travels about that axis 30, and to also pivot about one or both axes extending in directions perpendicular to the shutter axis 30 (and each other) to accommodate the linkage's 84 change in attitude between the open and closed positions. (For convenience, the relative movement at the input ball joint 88 is described with reference to the shutter axis 30, as the movement is already complex in the XYZ directions defined by the actuator axis 52 due to the skewed orientation of the shutter axis 30, as discussed above. Using the shutter axis 30 as the point of reference is more convenient for comparison to the movement at the output ball joint 88 and describing it in the same manner.) This can likewise be seen from comparing FIGS. 8 and 9 showing the open and closed positions in which the attitude of the link arm 90 on relative to the ball 34 changes as the shutter assembly 22 opens/closes. Thus, the ball joints 86, 88 function together to allow the attitude of the linkage 80, in the form of link arm 90, to change, thus accommodating the different travel paths of the input connector 32 (ball 34) and the actuator connector 54 (ball 60).

Figure 10:
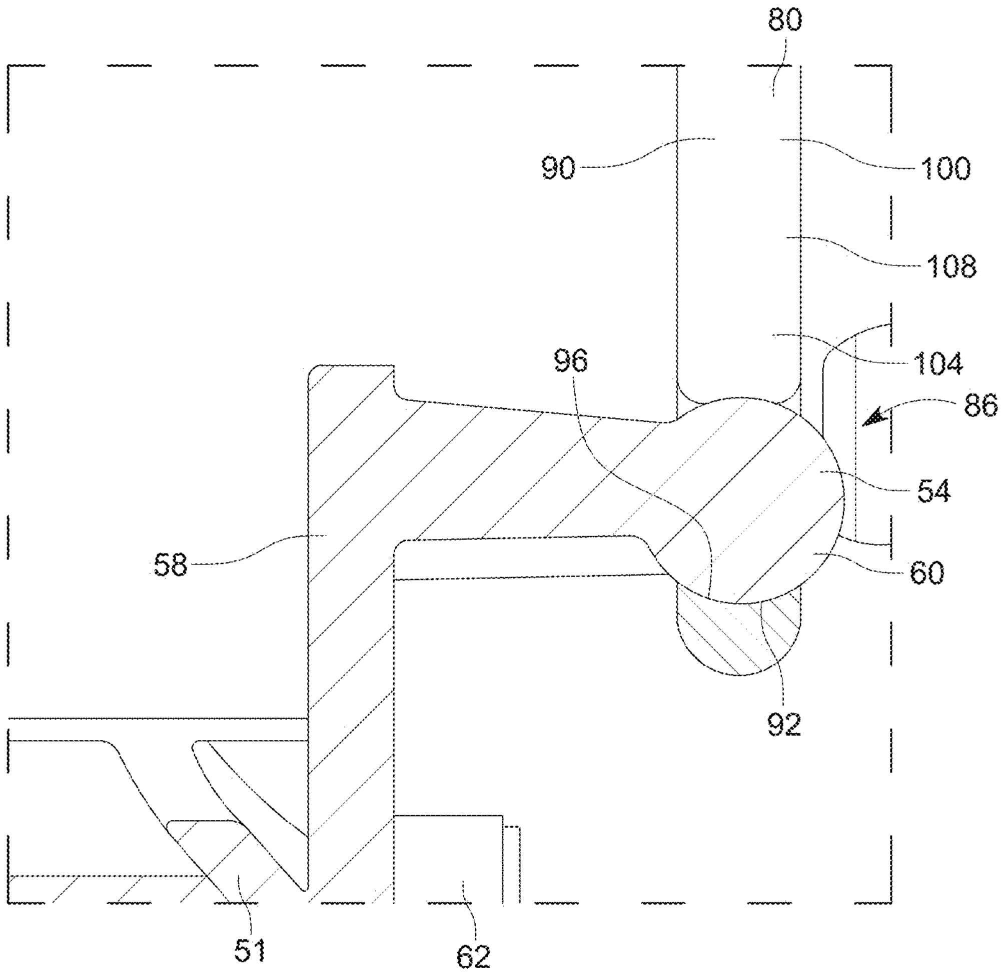
FIG. 10 is a cross-section of a representative ball joint used in the system.

In the non-limiting illustrated embodiment, each of the socket openings 92, 94 is a through opening extending through the link arm 90 and having an essentially circular inner surface 96. This is shown in FIG. 10, which is representative for all the ball joints (and thus only one is shown). Moreover, each circular inner surface 96 may be concave and faces into the opening 92, 94 for multi-axial rotational securement of the respective ball 34, 60. That is, the concavity provides a more secure engagement with the ball 34, 60 to provide the multi-axial rotation of the input and output ends of the link arm 90 discussed above. The shape of concavity is preferably chosen to conform to the ball 34, 60 and prevent the ball 34, 60 from withdrawing from the opening 92, 94. In the illustrated embodiment, the concavity of each essentially circular inner surface 96 is defined as circumscribed by an imaginary sphere. That is, if an imaginary sphere were placed inside the opening, the concavity of the surface 96 would match the sphere. Stated differently, the concavity preferably has a constant radius with a common centerpoint about its circumference (or is essentially close to such a configuration to still conform to the surface of the ball 34, 60). Likewise, the ball 34, 60 of each ball joint 86, 88 has a spherical shape corresponding to the imaginary sphere circumscribing the concavity of the essentially circular inner surface 96 associated therewith; it has a corresponding constant radius (excluding of course its point of connection to the shutter assembly 22 or the output arm 58). Because the radii of the balls 34, 60 and the surfaces 96 match each other, respectively, the balls 34, 60 are securely retained, yet can still pivot as needed about the various axes.

In the illustrated embodiment, each essentially circular opening 92, 94 also includes an expansion slot 100, 102 extending therefrom. The slots 100, 102 are also formed through the thickness of the link arm 90 and open into the openings 92, 94, extending inwardly therefrom in the longitudinal direction of the link arm 90. These slots 100, 102 are provided to permit material of the link arm 90 adjacent the openings 92, 94 to deform for insertion of the respective ball 34, 60 and return to establish the multi-axial rotational securement thereof. That is, the material is sufficiently resilient to return to its original position once the ball 34, 60 has been inserted to prevent withdrawal of the ball 34, 60. The use of the slots 100, 102 is advantageous (but not limiting) because it enables the link arm 90 to be made of a more rigid material, while still permitting deflection of the material due to the geometry of the area where the slots 100, 102 meet their respective openings 92, 94. The material in the area where the slots 100, 102 meet their respective openings 92, 94 and the width of the slots 100, 102 also prevents the balls 34, 60 from deflecting the material to enter the slots 100, 102 in the longitudinal direction of the arm 90 during the opening or closing of the shutter assembly 22.

Each slot 100, 102 has a narrow portion 104, 106 (narrow being in the longitudinal direction of the link arm 92) opening into the openings 92, 94, and a wider portion 108, 110 inward of the narrow portions 104, 106. This optional configuration advantageously provides sufficient freedom for the material of the link arm 90, 92 on the opposing sides of the narrow portions 104, 106 to deflect in the insertion direction as a ball 34, 60 is being inserted, while also preventing deflection in the longitudinal direction of the arm 90 as during opening or closing of the shutter assembly 22. In particular, when a ball 34, 60 is being inserted (the insertion direction being somewhat perpendicular to the longitudinal direction), the material on the opposing sides of the narrow portions 104, 106 can deflect in that direction because the adjacent wider portion 108, 110 permit the narrow portion material to deflect in a cantilever manner about the region of connection to the remainder of the arm 90. However, if the ball 34, 60 is forced against the narrow portions 104, 106, the force is acting in the longitudinal direction of the arm 90. Thus, force applied to the narrow portions 104, 106 is in their plane (and the plane of the arm) and results predominantly in shear stress along the region of connection to the remainder of the arm 90. This resists deflection to avoid disconnection of the balls 34, 60 during operation.

The ball joints 86, 88 illustrated are not limiting. For example, in some embodiments the balls and socket openings could be reversed, i.e., the balls could be on the linkage 80 while the socket openings could be on the shutter assembly 22 and output arm 58. Likewise, the through-hole socket openings could be replaced by cup-shaped sockets. Also, a ball need not be a full ball, and a partial ball may be used (which has a ball-shape in the area where the sliding action between the ball and socket happens, and may be cut-off or have any shape in other areas). Any ball joint construction or configuration may be used, and the illustrated example is not intended to be limiting.

Other multi-axial joints are also possible. For example, a joint may include a universal joint, such as a universal joint replacing one of the ball joints. A universal joint is also referred to as a Cardan joint. The two axes included in such a joint may be supplemented by a third mutually perpendicular axis provided by a pivotal connection, such as a rivet or other fastener to the linkage. A double Cardan joint may also be used for one or both joints. The ball joints illustrated are advantageous for simplicity and cost effectiveness, and the configuration that resists withdrawal of the ball provides security with low complexity.

In addition to the advantage of accommodating challenging packaging constraints, another non-limiting advantage of the joints used in the system 10 is that they can accommodate variances in the orientations of the shutter and actuator axes 30, 52 without the need for a design change. This may be advantageous if the vehicle OEM opts to alter the vehicle front end curvature because altering the system 10 may not be needed, as the joints are already capable of accommodating changes in orientation. Likewise, for vehicle model lines that have different sizes (and thus may have different front ends), the ability for the same system 10 to be installed with axes 30, 52 in different orientations, such as may be due to shutter assemblies 22 being at different angles relative to the vehicle, may allow the same system 10 to be used across different model sizes (or even different models entirely). Alternatively, the system 10 may only need a straightforward change, like a link arm 90 of different length and/or a shutter panel 28 of different shape/size while keeping the system 10 otherwise the same, to accommodate such alterations or differences between model sizes or model lines.

Figure 2:
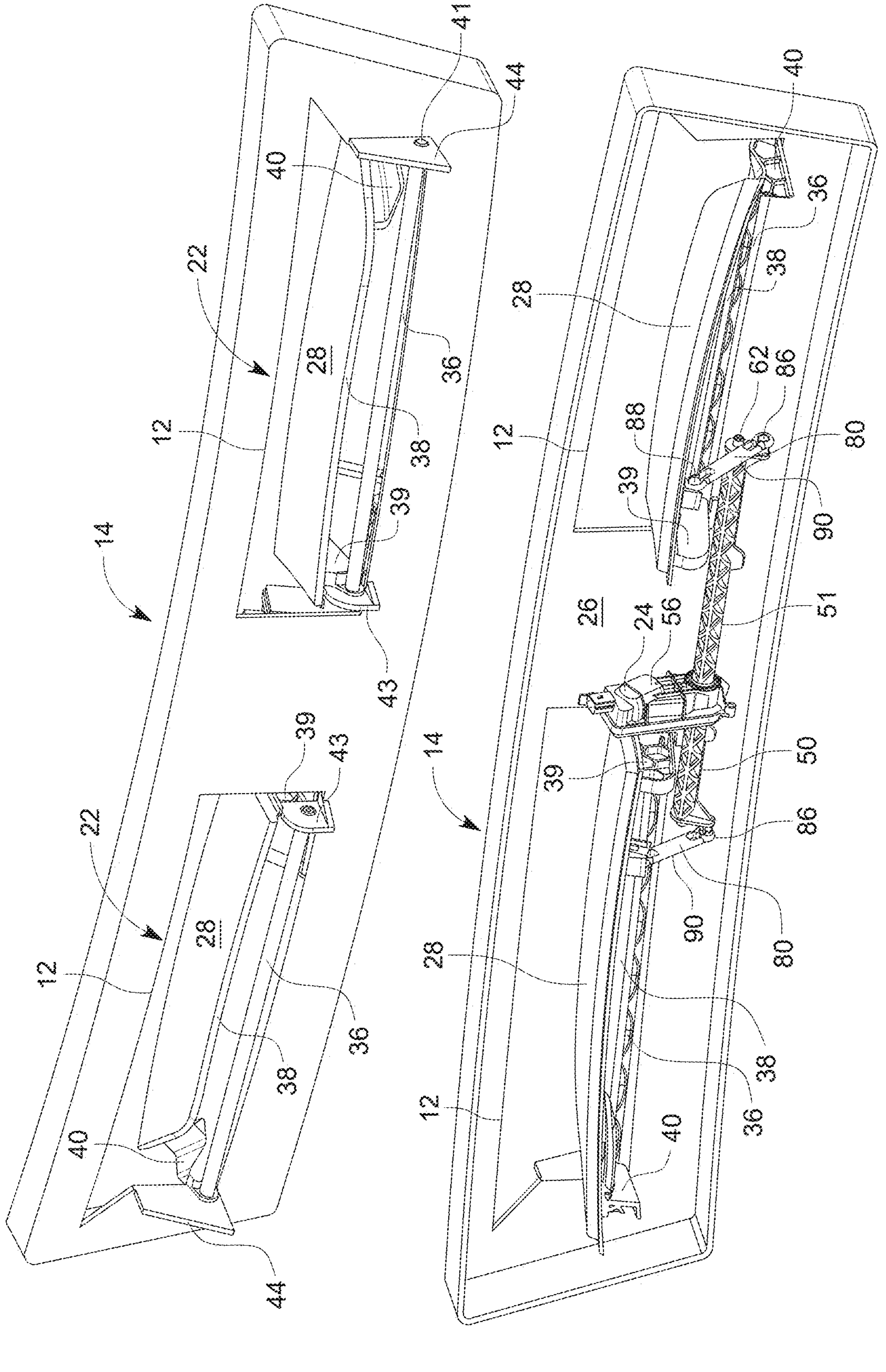
FIG. 2 is similar to FIG. 1, with the shutter assemblies in the open position.
Figure 3:
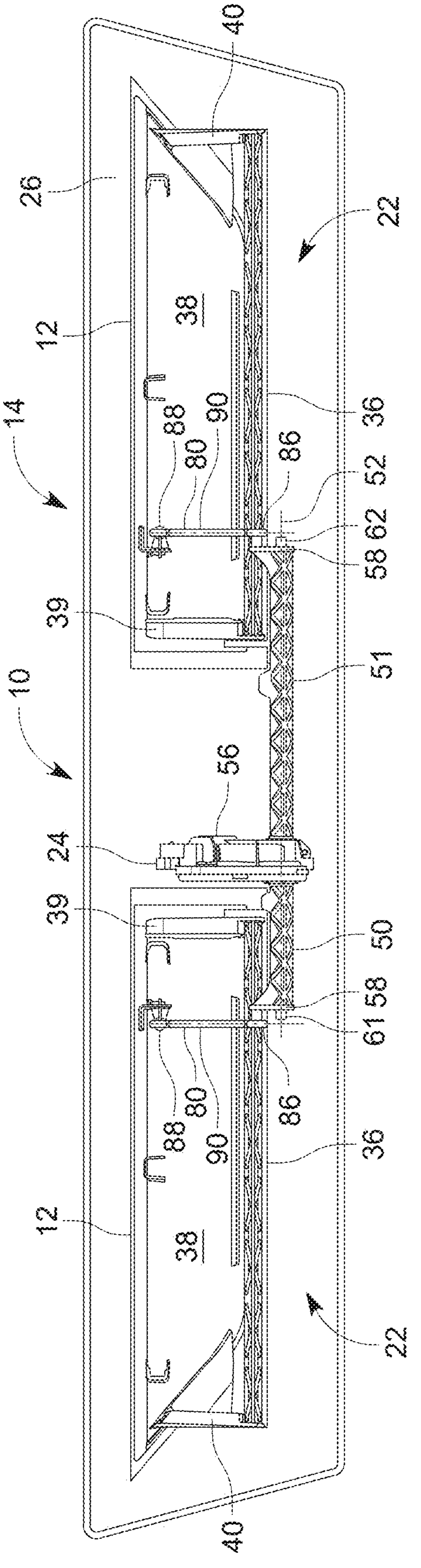
FIG. 3 is a rear view (i.e. from inside the vehicle and facing forward) showing the system of FIG. 1, with the shutter assemblies in the closed position.
Figure 4:
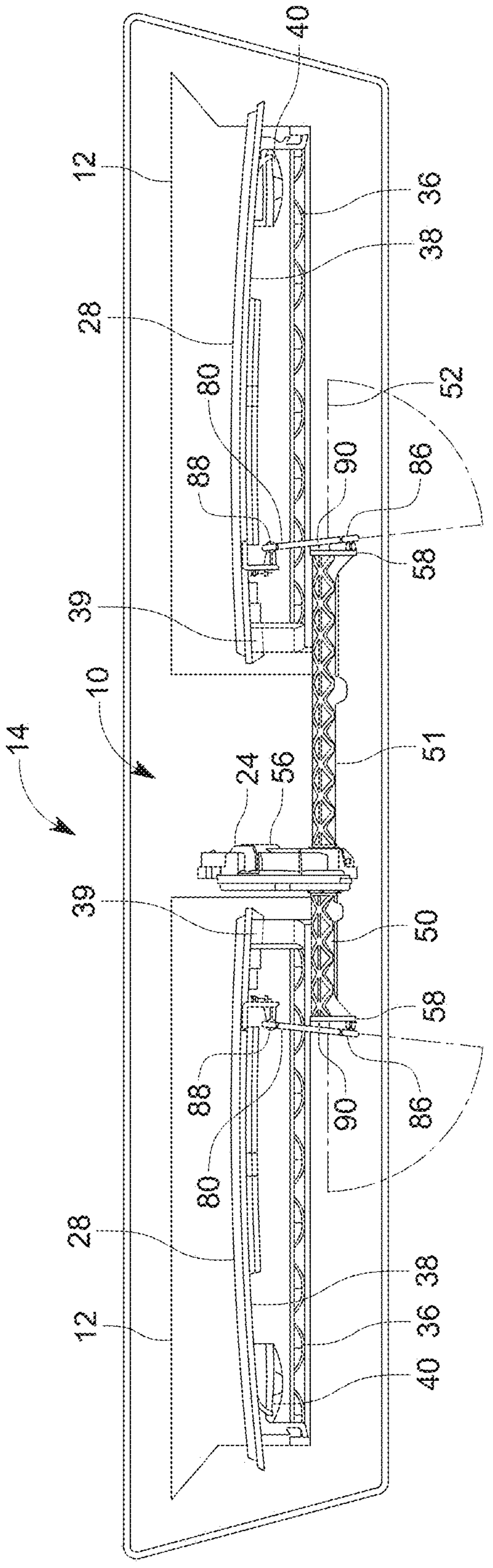
FIG. 4 is similar to FIG. 3, with the shutter assemblies in the open position.

Another non-limiting advantage is that flexibility to orient a shutter axis at an angle to the cross-vehicle direction enables the orientation of the shutter panel 28 in the open position to be more horizontal. With curved panels, when a panel is rotated about a cross-vehicle axis, the result tends to be that the outboard edge is visibly lower than the inboard edge, with downward curvature towards the outboard edge. This appears misaligned with the general contour and visible appearance of the vehicle. This may be referred loosely as a "sad face," as two panels curving downwardly to their outboard edges are reminiscent of a frown. With the orientation of the shutter axes in the present application, as can be seen in FIGS. 2 and 4 for example, the panels 28 have a more horizontal attitude, which has a better aesthetic appearance.

Figure 6:
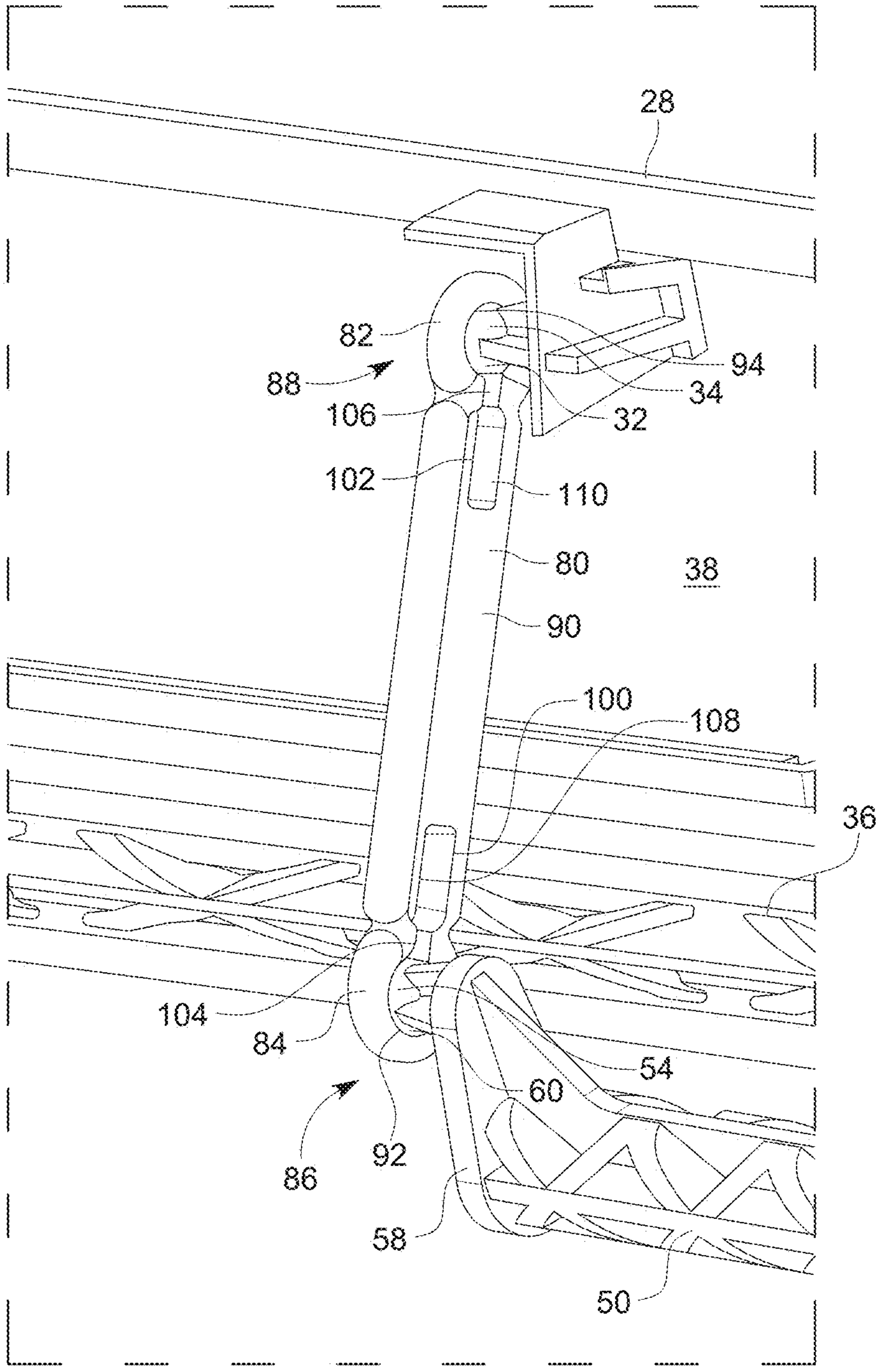
FIG. 6 is a close-up perspective view showing a linkage and connections thereof used in the system.
Figure 7:
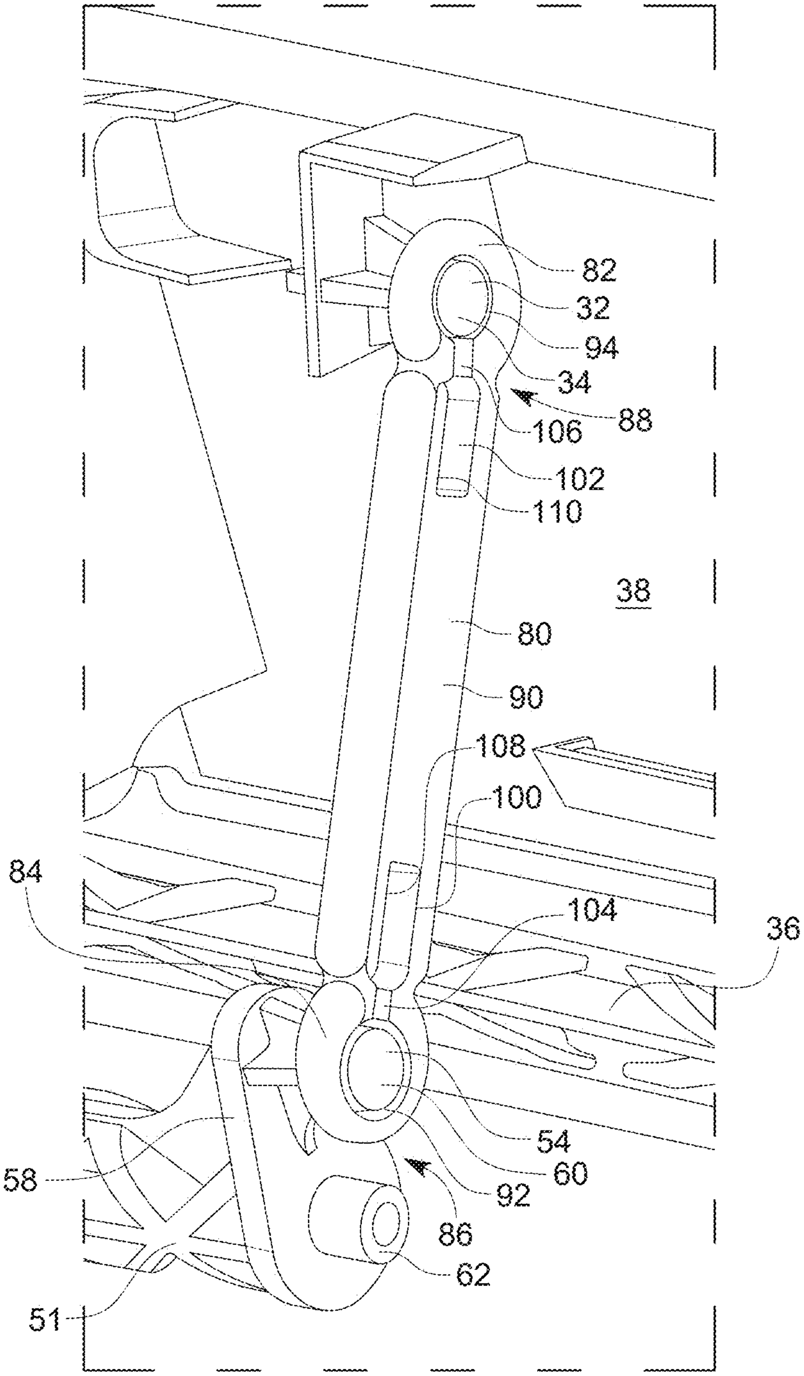
FIG. 7 is another close-up perspective view showing a linkage and connections thereof used in the system.

Another advantage of the non-limiting embodiment is having the connector 54 offset radially from the actuator axis 52 increases the mechanical leverage, providing more force per unit torque for transfer from a rotating shaft to a shutter assembly 22 through the linkage 80. A greater radial offset increases that leverage. Additionally, as can be seen from e.g. FIGS. 6 and 7, when the panel 28 is in the closed position, the link arm 90 and the output arm 58 are close to alignment. That is, the angle between them is obtuse, and close to 180 degrees. This reduces the amount of force transferred from the link arm 90 to the output arm 58 in the direction perpendicular to the radial direction of the output arm 58. This shallow angle relationship reduces the torque applied to the shaft as a result of air force pushing inwardly on the panel 28 as the vehicle is driven forward, which in turn reduces the amount of torsional resistance borne by the actuator 24.

In the illustrated embodiment, some or all the mechanical components of the system 10 may be formed of plastic for reduced weight and ease of manufacture by molding. Also, as an optional feature, some of the structures such as the shafts and arms used included ribbing to provide structural rigidity with less weight. However, the some or all of the mechanical components of the system 10 may also be made from metal, composites, or any other suitable material. The present application is not limited to any particular material choice for the mechanical components of the system 10.

The present application contemplates that embodiments may be delivered in disassembled or partially assembled form for final assembly at the time of installation to the vehicle front end. Thus, the application includes and covers embodiments that are delivered or shipped in disassembled or partially assembled form and does not require actual connection of all components for operation until final installation. For example, the intermediate linkage 80 could be connected to one or both of the shutter assembly 22 and the actuator 24 during installation in the vehicle front end, rather than at the source of manufacturing. Thus, the system 10 could be shipped with the intermediate linkage 80 disconnected or partially connected by connection to just one of the shutter assembly 22 or actuator 24. Likewise, the system 10 could be shipped fully assembled.

The foregoing illustrated embodiment has been provided solely to illustrate the structural and functional principles of the present application and is not intended to be limiting. To the contrary, the present application encompasses all alterations, modifications, substitutions and equivalents within the spirit and scope of the following claims.

What is claimed:

1. An active vehicle air intake shutter system for installation at an air intake opening on a front end of a motor vehicle, the opening extending at least in a lateral direction of the vehicle, wherein the front end of the vehicle has a rounded or bowed configuration, the opening being curved at least in the lateral direction of the vehicle, the system comprising:

an intake shutter assembly for mounting at the air intake opening and comprising a curved shutter panel, the intake shutter assembly being pivotable about a shutter axis between a closed position positioning the shutter panel to block airflow through the air intake opening and an open position positioning the shutter panel to permit airflow through the air intake opening, wherein the intake shutter assembly includes an input connector offset radially with respect to the shutter axis;

an actuator having an output shaft rotatable about an actuator axis, the output shaft having an output connector offset radially with respect to the actuator axis;

an intermediate linkage having a shutter connector for coupling to the input connector and an actuator connector for coupling to the output connector to enable rotation of the output shaft in a first direction to pivot the shutter assembly in an opening direction and a second direction to pivot the shutter assembly in a closing direction;

wherein the actuator connector and the output connector are configured to provide an output multi-axial joint offset radially from the actuator axis; and wherein the shutter connector and the input connector are configured to provide an input multi-axial joint offset radially from the shutter axis;

wherein the input and output multi-axial joints each provide for multi-axial rotation of input and output ends of the intermediate linkage, respectively, to accommodate installation of the shutter system with the actuator axis and the shutter axis oriented in a non-parallel or skewed manner;

wherein the actuator axis is an X-axis of an X-Y-Z system with a Y-axis vertically perpendicular to the X-axis and a Z-axis horizontally perpendicular to the X-axis, and wherein:

the output connector's path of travel is circumferential about the actuator axis as the X-axis;

the input connector's path of travel is complex within the X-Y-Z system with its movement having components in all three X, Y and Z directions, including in the X-direction towards the output shaft; and a positional attitude of the intermediate linkage changes as the curved shutter panel is moved between the open and closed positions including (a) pivoting of the intermediate linkage about an axis in the Z-direction and pivoting about an axis in the Y-direction at the output multi-axial joint and (b) pivoting about a pair of axes extending in directions perpendicular to the shutter axis and each other at the input multi-axial joint.

2. The active vehicle air intake shutter system of claim 1, wherein the output multi-axial joint is an output ball joint and the input multi-axial joint is an input ball joint offset radially from the shutter axis;

wherein the input and output ball joints each provide for the multi-axial rotation of the input and output ends of the intermediate linkage, respectively, to accommodate installation of the shutter system with the actuator axis and the shutter axis oriented in the non-parallel or skewed manner.

3. The active vehicle air intake shutter system of claim 2, wherein the intermediate linkage comprises at least one link arm.

4. The active vehicle air intake shutter system of claim 3, wherein the intermediate linkage has only one link arm having the input and output ends of the intermediate linkage.

5. The active vehicle air intake shutter system of claim 4, wherein the output ball joint includes a ball as the output connector and a socket opening as the actuator connector for receiving the ball, and wherein the input ball joint includes a ball as the input connector and a socket opening as the shutter connector for receiving the ball.

6. The active vehicle air intake shutter system of claim 5, wherein each of the socket openings is a through opening extending through the link arm and having an essentially circular inner surface.

7. The active vehicle air intake shutter system of claim 6, wherein each essentially circular inner surface is concave and faces into the opening for multi-axial rotational securement of the respective ball to provide the multi-axial rotation of the input and output ends of the link arm.

8. The active vehicle air intake shutter system of claim 7, wherein the concavity of each essentially circular inner surface is defined as circumscribed by an imaginary sphere.

9. The active vehicle air intake shutter system of claim 8, wherein the ball of each ball joint has a spherical shape corresponding to the imaginary sphere circumscribing the concavity of the essentially circular inner surface associated therewith.

10. The active vehicle air intake shutter system of claim 8, wherein each essentially circular opening also includes an expansion slot extending therefrom for permitting material of the link arm adjacent the opening to deform for insertion of the respective ball and return to establish the multi-axial rotational securement thereof.

11. The active vehicle air intake shutter system of claim 10, wherein the actuator further comprises an output arm extending radially from the output shaft and having the actuator connector ball.

12. The active vehicle air intake shutter system of claim 11, wherein the input connector ball is connected at an upper edge of the shutter panel.

13. The active vehicle air intake shutter system of claim 12, wherein the intake shutter assembly further comprises a shutter shaft for rotation about the shutter axis, and a pair of arms connecting the shutter panel to the shutter shaft for supporting the shutter panel on the shutter shaft to pivot between the open and closed positions thereof.

14. The active vehicle air intake shutter system of claim 7, wherein each essentially circular opening also includes an expansion slot extending therefrom for permitting material of the link arm adjacent the opening to deform for insertion of the respective ball and return to establish the multi-axial rotational securement thereof.

15. The active vehicle air intake shutter system of claim 14, wherein the actuator further comprises an output arm extending radially from the output shaft and having the actuator connector ball.

16. The active vehicle air intake shutter system of claim 15, wherein the input connector ball is connected at an upper edge of the shutter panel.

17. The active vehicle air intake shutter system of claim 16, wherein the intake shutter assembly further comprises a shutter shaft for rotation about the shutter axis, and a pair of arms connecting the shutter panel to the shutter shaft for supporting the shutter panel on the shutter shaft to pivot between the open and closed positions thereof.

18. The active vehicle air intake shutter system of claim 7, wherein the actuator further comprises an output arm extending radially from the output shaft and having the actuator connector ball.

19. The active vehicle air intake shutter system of claim 18, wherein the input connector ball is connected at an upper edge of the shutter panel.

20. The active vehicle air intake shutter system of claim 19, wherein the intake shutter assembly further comprises a shutter shaft for rotation about the shutter axis, and a pair of arms connecting the shutter panel to the shutter shaft for supporting the shutter panel on the shutter shaft to pivot between the open and closed positions thereof.

21. The active vehicle air intake shutter system of claim 5, wherein the actuator further comprises an output arm extending radially from the output shaft and having the actuator connector ball.

22. The active vehicle air intake shutter system of claim 21, wherein the input connector ball is connected at an upper edge of the shutter panel.

23. The active vehicle air intake shutter system of claim 22, wherein the intake shutter assembly further comprises a shutter shaft for rotation about the shutter axis, and a pair of arms connecting the shutter panel to the shutter shaft for supporting the shutter panel on the shutter shaft to pivot between the open and closed positions thereof.

24. The active vehicle air intake shutter system of claim 2, wherein the actuator includes an electric motor for rotating the output shaft.

25. The active vehicle air intake shutter system of claim 24, wherein the actuator further comprises an output arm extending radially from the output shaft and having the output connector.

26. The active vehicle air intake shutter system of claim 25, wherein the input connector is connected at an upper edge of the shutter panel.

27. The active vehicle air intake shutter system of claim 26, wherein the intake shutter assembly further comprises a shutter shaft for rotation about the shutter axis, and a pair of arms connecting the shutter panel to the shutter shaft for supporting the shutter panel on the shutter shaft to pivot between the open and closed positions thereof.

28. The active vehicle air intake shutter system of claim 2, wherein the input connector is connected at an upper edge of the shutter panel.

29. The active vehicle air intake shutter system of claim 28, wherein the intake shutter assembly further comprises a shutter shaft for rotation about the shutter axis, and a pair of arms connecting the shutter panel to the shutter shaft for supporting the shutter panel on the shutter shaft to pivot between the open and closed positions thereof.

30. The active vehicle air intake shutter system of claim 1, wherein the input connector is connected at an upper edge of the curved shutter panel.

31. The active vehicle air intake shutter system of claim 30, wherein the intake shutter assembly further comprises a shutter shaft for rotation about the shutter axis, and a pair of arms connecting the curved shutter panel to the shutter shaft for supporting the curved shutter panel on the shutter shaft to pivot between the open and closed positions thereof, wherein the input connector is connected at the upper edge of the curved shutter panel between said pair of arms.

32. A motor vehicle comprising:

a front end with an air intake opening extending at least in a lateral direction of the vehicle, wherein the front end of the vehicle has a rounded or bowed configuration, the opening being curved at least in the lateral direction of the vehicle; and an active vehicle air intake shutter system installed at the air intake opening, the shutter system comprising:

an intake shutter assembly mounted at the air intake opening and comprising a curved shutter panel, the intake shutter assembly being pivotable about a shutter axis between a closed position positioning the shutter panel to block airflow through the air intake opening and an open position positioning the shutter panel to permit airflow through the air intake opening, wherein the intake shutter assembly includes an input connector offset radially with respect to the shutter axis;

an actuator having an output shaft rotatable about an actuator axis, the output shaft having an output connector offset radially with respect to the actuator axis;

the actuator axis and the shutter axis being oriented in a non-parallel or skewed manner;

an intermediate linkage having a shutter connector coupled to the input connector and an actuator connector coupled to the output connector to enable rotation of the output shaft in a first direction to pivot the shutter assembly in an opening direction and a second direction to pivot the shutter assembly in a closing direction;

wherein the actuator connector and the output connector provide an output multi-axial joint offset radially from the actuator axis; and wherein the shutter connector and the input connector provide an input multi-axial joint offset radially from the shutter axis;

wherein the input and output multi-axial joints each provide for multi-axial rotation of input and output ends of the intermediate linkage, respectively, to accommodate installation of the shutter system with the actuator axis and the shutter axis oriented in the non-parallel or skewed manner;

wherein the actuator axis is an X-axis of an X-Y-Z system with a Y-axis vertically perpendicular to the X-axis and a Z-axis horizontally perpendicular to the X-axis, and wherein:

the output connector's path of travel is circumferential about the actuator axis as the X-axis;

the input connector's path of travel is complex within the X-Y-Z system with its movement having components in all three X, Y and Z directions, including in the X-direction towards the output shaft;

a positional attitude of the intermediate linkage changes as the curved shutter panel is moved between the open and closed positions including (a) pivoting of the intermediate linkage about an axis in the Z-direction and pivoting about an axis in the Y-direction at the output multi-axial joint and (b) pivoting about a pair of axes extending in directions perpendicular to the shutter axis and each other at the input multi-axial joint.

33. The motor vehicle of claim 32, wherein the input connector is connected at an upper edge of the curved shutter panel.

34. The motor vehicle of claim 33, wherein the intake shutter assembly further comprises a shutter shaft for rotation about the shutter axis, and a pair of arms connecting the curved shutter panel to the shutter shaft for supporting the curved shutter panel on the shutter shaft to pivot between the open and closed positions thereof, wherein the input connector is connected at the upper edge of the curved shutter panel between said pair of arms.

* * * * *